E. F. KOLOSICK.
FENDER FOR CORN PLOWS.
APPLICATION FILED NOV. 4, 1908.

918,332.

Patented Apr. 13, 1909.

2 SHEETS—SHEET 1.

E. F. KOLOSICK.
FENDER FOR CORN PLOWS.
APPLICATION FILED NOV. 4, 1908.
918,332.
Patented Apr. 13, 1909.
2 SHEETS—SHEET 2.
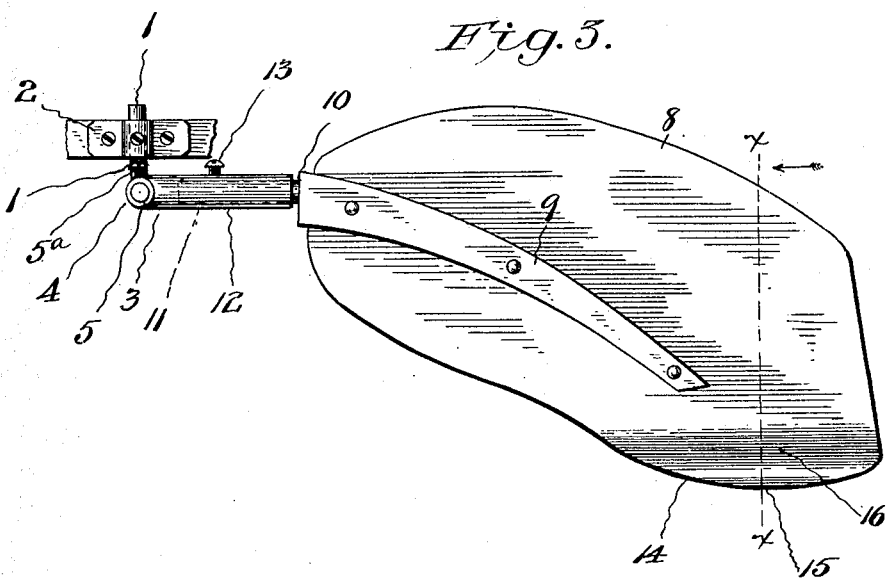
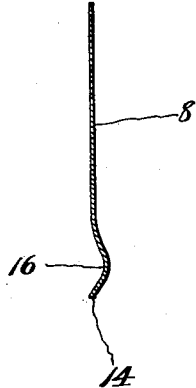
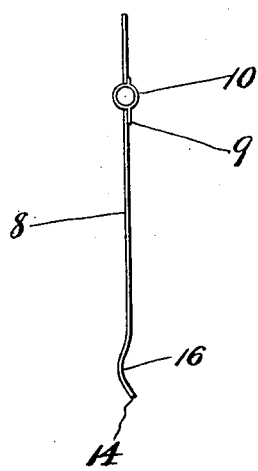

UNITED STATES PATENT OFFICE.

ELMER FRANK KOLOSICK, OF WASHINGTON, IOWA.

FENDER FOR CORN-PLOWS.

No. 918,332.　　　　Specification of Letters Patent.　　　Patented April 13, 1909.

Application filed November 4, 1908. Serial No. 461,012.

*To all whom it may concern:*

Be it known that I, ELMER FRANK KOLOSICK, a citizen of the United States, and a resident of Washington, in the county of Washington and State of Iowa, have invented certain new and useful Improvements in Fenders for Corn-Plows, of which the following is a specification.

My invention relates to fenders for corn plows and has for its object the provision of a fender constructed of a plate of rigid material so secured at the side of the plow as to protect the young corn from the clods thrown up by the implement while it is so shaped as to break up the earth in the hill and cut out the grass and weeds without disturbing or damaging the plants.

The construction and operation of my improved fender will be described in detail hereinafter and illustrated in the accompanying drawings, in which—

Figure 1:
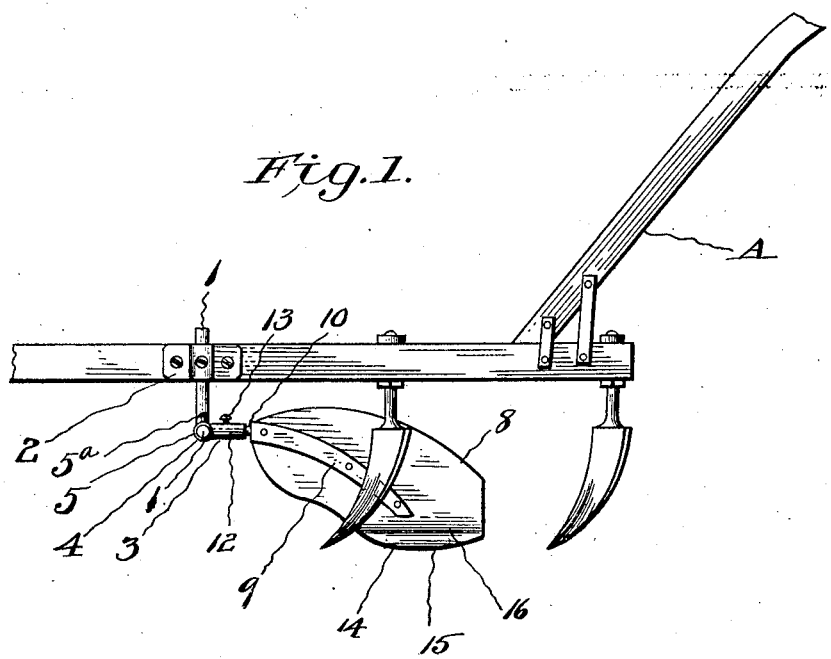
Figure 5:
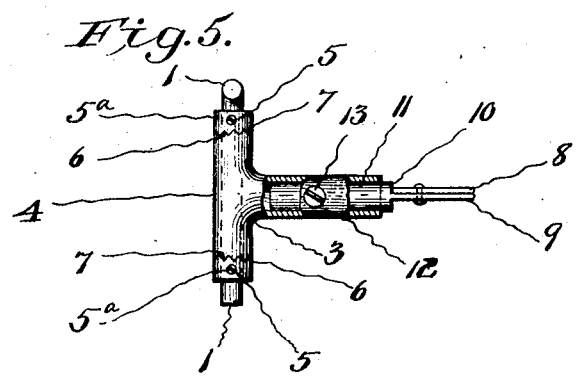

Figure 1 is a view of a plow with my improved fender in position thereon; Fig. 2, a front view; Fig. 3, a view of one fender and its mountings on an enlarged scale; Fig. 4, a section of the fender-plate on the line x x of Fig. 3; and Fig. 5, a detail view of the cross-arm and T-shaped coupling.

In the drawings similar reference characters indicate corresponding parts in all of the views.

A indicates a conventional corn-plow, to which my improved fender, hereinafter described, is attached. Secured to each side of plow A are L-shaped attachments 1 by means of clamps 2, engaging one of the arms thereof.

3 indicates a T-shaped coupling, having its cross-arm 4 mounted on the free arm of attachment 1 by means of collars 5, secured thereto at each end of the cross-bar 4 by means of set-screws 5ª. The ends of cross-arm 4 are notched, as shown at 6, while the collars 5 are formed with lugs 7, that engage said notches to permit adjusting the fender for a shallow or deep cut, and to suit the work to be performed.

The fender is constructed of a plate 8 of metal, such as plow steel, and secured to a bar 9, having its forward end 10 formed with a shank 11, circular in cross-section, that is secured in stem 12 of T-coupling 3 by means of set-screws 13. The edge of the plate 8 that engages the ground and is indicated at 14 is rounded, as shown at 15, and then bent or curled longitudinally or on a plane substantially parallel with the ground, as shown at 16, to form a cutting-blade that, when in use, cuts out the grass and weeds in the hills and agitates the earth around the roots of the corn so as to leave the soil in a light condition to better nourish the young plants.

By securing the T-coupling to the L-shaped attachment by means of the adjustable collars 5 and adjustably securing the shank 11 in stem 12 of the coupling it will be apparent that the fender may be adjusted as desired to secure the most efficient operation.

Having thus described my invention, what I claim is—

1. In a fender for corn-plows, an L-shaped attachment, a T-shaped coupling having its cross-arm mounted on one arm of said attachment said cross-arm having notched ends, collars mounted on said cross-arm and having lugs engaging said notches, means to secure said collars to the attachment, and the fender having a shank secured in the stem of said coupling, substantially as shown and described.

2. In a fender for corn-plows, an L-shaped attachment secured to the plow, a T-shaped coupling having its cross-arm mounted on said attachment, said cross-arm having notched ends, collars mounted on said attachment at each end of said cross-arm, and having lugs to engage said notches, set-screws to removably secure the collars to the attachment, the fender secured to a rod having its end extending beyond it and forming a shank mounted in the stem of the coupling, and a set-screw secured to said stem and engaging said shank, substantially as shown and described.

3. In a fender for corn-plows, an L-shaped attachment secured to the plow, a T-shaped coupling having its cross-arm mounted on said attachment and having notches in its ends, collars removably secured to said attachment at each end of said cross-arm and having lugs engaging said notches, the fender consisting of a plate secured to a rod having one end extending beyond the plate to form a shank, said shank adjustably secured to the stem of the T-coupling, the fender-plate having the edge engaging the ground rounded and curled longitudinally therewith, substantially as shown and described.

In witness whereof, I have hereunto set my hand in presence of two subscribing witnesses.

ELMER FRANK KOLOSICK.

Witnesses:
JULIA SWIFT,
C. C. WILSON.